United States Patent
D'Agostini

(10) Patent No.: US 7,621,154 B2
(45) Date of Patent: Nov. 24, 2009

(54) SOLID FUEL COMBUSTION FOR INDUSTRIAL MELTING WITH A SLAGGING COMBUSTOR

(75) Inventor: Mark Daniel D'Agostini, Ebensburg, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 390 days.

(21) Appl. No.: 11/743,217

(22) Filed: May 2, 2007

(65) Prior Publication Data

US 2008/0271491 A1 Nov. 6, 2008

(51) Int. Cl.
*C03B 5/16* (2006.01)

(52) U.S. Cl. .......................... 65/134.4; 65/19; 110/347; 110/345; 110/264; 431/10

(58) Field of Classification Search ................ 65/134.4, 65/19; 110/347, 345, 264
See application file for complete search history.

(56) References Cited

U.S. PATENT DOCUMENTS

| | | | |
|---|---|---|---|
| 3,969,068 A | 7/1976 | Miller et al. | |
| 4,006,003 A | 2/1977 | Daiga | |
| 4,055,400 A | 10/1977 | Stambaugh et al. | |
| 4,544,394 A | 10/1985 | Hnat | |
| 4,631,080 A | 12/1986 | Westra et al. | |
| 4,741,741 A | 5/1988 | Salem et al. | |
| 4,957,527 A | 9/1990 | Hnat | |
| 5,114,122 A | 5/1992 | Hnat | |
| 5,209,187 A | 5/1993 | Khinkis | |
| 5,312,462 A | 5/1994 | Nowak | |
| 5,575,637 A | 11/1996 | Slavejkov et al. | |
| 5,878,700 A | 3/1999 | Farzan et al. | |
| 5,979,191 A | 11/1999 | Jian | |
| 6,085,674 A | 7/2000 | Ashworth | |
| 6,789,396 B2 | 9/2004 | Olin-Nunez et al. | |
| 6,910,432 B2 | 6/2005 | D'Agostini et al. | |
| 6,968,791 B2 | 11/2005 | D'Agostini et al. | |
| 7,390,189 B2 * | 6/2008 | D'Agostini ................... 431/10 |
| 2006/0150677 A1 | 7/2006 | Kobayashi | |

FOREIGN PATENT DOCUMENTS

WO 2005094153 10/2005

OTHER PUBLICATIONS

D'Agostini, Mark D. and Fogash, Kevin B., "Oxygen-Enhanced Combustion in Slagging Cyclone Combustors"; Air Products and Chemicals, Inc.; Presented at the 2005 DOE Pittsburgh Coal Conference, Pittsburgh, PA; Sep. 12-15, 2005.

Suzuki, T., et al; "Development of a low-NOx Emission Slagging Combustor"; Combustion Science and Technology, Goron and Breach Science Publishers, New York, NY; Jan. 1, 1993; vol. 93; pp. 1-6; XP009104847.

* cited by examiner

*Primary Examiner*—Mark Halpern
(74) *Attorney, Agent, or Firm*—Bryan C. Hoke, Jr.

(57) ABSTRACT

A method for supplying heat to a melting furnace for forming a molten product using ash-containing fuels. A fuel having an ash component is introduced into a slagging chamber of a slagging combustor and at least partially combusted with a first oxidant mixture and a second oxidant mixture within the slagging chamber. Ash component is collected as a layer of molten slag in the slagging chamber. Slagging combustor gas effluent is passed from the slagging chamber of the slagging combustor into the combustion space of the melting furnace at high temperature to supply heat to form the molten product. Molten slag is withdrawn from the slagging chamber of the slagging combustor and may be selectively introduced into the melting furnace or not introduced into the melting furnace.

16 Claims, 2 Drawing Sheets

SOLID FUEL COMBUSTION FOR INDUSTRIAL MELTING WITH A SLAGGING COMBUSTOR

BACKGROUND

The present invention relates generally to the field of materials melting and melting furnaces, and more particularly to materials melting by combusting ash-containing fuels for supplying heat for the melting process.

Gaseous and liquid fuels are commonly used for supplying heat to melting furnaces. Gaseous or liquid fuels are introduced into a melting furnace along with an oxidant, which may be air, oxygen-enriched air, and/or industrial oxygen, to form combustion flames overlaying the melt and/or charge. The use of solid, ash-containing fuels in melting furnaces is unusual because of the potential for the ash component to introduce defects into the molten product and the potential for the ash component to promote degradation of the furnace refractory.

Prior art for supplying heat to melting furnaces using solid fuels has taught using low ash fuel, using different furnace refractory, modifying the solid fuel to remove ash before burning the solid fuel, and operating the furnace so as to pneumatically convey the ash particles out of the melter.

U.S. Patent Application 2006/0150677 by Kobayashi for reducing corrosion and particulate emission in glassmelting furnaces states that fuels with low ash contents are preferred to lessen the risk that ash in the fuel would mix into the glassmelt and influence the glass quality as well as to lessen the risk of refractory corrosion by ash deposition. Coal and petroleum coke typically have ash contents of 5-20% and 0.1-1% respectively by weight. Thus, petroleum coke is a preferred fuel of the process of Kobayashi.

U.S. Pat. No. 6,789,396 to Olin-Nunez et al. for a method and system for feeding and burning a pulverized fuel in a glass melting furnace, and burner for use in the same, states as an object of the invention to provide a method and system for feeding and burning a pulverized fuel in a glass melting furnace, which uses special refractories for the construction of the chambers of the glass melting furnace with the object of diminishing the erosive and abrasive effects produced by the burning of said pulverized fuel, especially by the effects produced by the $V_2O_5$.

U.S. Pat. No. 4,055,400, to Stambaugh et al., U.S. Pat. No. 5,312,462 to Nowak, U.S. Pat. No. 4,741,741 to Salem et al. disclose methods for reducing the ash content of coal.

U.S. Pat. No. 4,006,003 to Daiga for a process for melting glass states that by maintaining a sufficient velocity of the flow residual ash from the burning of the coal, the residual ash can be maintained in suspension in the gaseous flow and the ash thereby pneumatically conveyed from the glass melter out of appropriate ports therein without allowing the ash to be brought into contact with the molten glass or any batch ingredients carried by the surface thereof. In this manner by adjusting the velocity of the gaseous flow above the surface of the glass substantially all of the residual ash can be removed without allowing it to come into contact with the molten pool beneath it.

It would be desirable to use ash-containing fuel without introducing unacceptable defects caused by ash.

It would be desirable to use ash-containing fuel without causing unacceptable furnace refractory degradation.

BRIEF SUMMARY

The present disclosure relates to a method for supplying heat to a melting furnace for forming a molten product. The method comprises introducing a first fuel having an ash component and a combustible component into a slagging chamber of a slagging combustor, introducing a first oxidant mixture into the slagging chamber of the slagging combustor, the first oxidant mixture having an oxygen concentration of 10 volume % to 100 volume % or 10 volume % to 20 volume % or 20 volume % to 30 volume %, optionally introducing a second fuel into the slagging chamber of the slagging combustor, introducing a second oxidant mixture into the slagging chamber of the slagging combustor, the second oxidant mixture having an oxygen concentration of 22 volume % to 100 volume % or 60 volume % to 75 volume % or 85 volume % to 100 volume %, combusting at least a portion of the combustible component of the first fuel and optionally at least a portion of the second fuel in the slagging chamber of the slagging combustor thereby forming a separated ash component and forming a slagging combustor gas effluent, collecting at least a portion of the separated ash component as a layer of a molten slag contiguous with at least a portion of an inner surface of the slagging chamber, passing at least a portion of the slagging combustor gas effluent from the slagging chamber of the slagging combustor into a combustion space in the melting furnace at a temperature of 1000° C. to 2500° C. to supply heat to form the molten product, and withdrawing the molten slag from the slagging chamber of the slagging combustor.

The slagging combustor gas effluent may contain at least one uncombusted combustible gas. The method may further comprise introducing a third oxidant mixture into the combustion space of the melting furnace, the third oxidant mixture having an oxygen concentration of 20 volume % to 100 volume % or 60 volume % to 75 volume % or 85 volume % to 100 volume %, and combusting at least a portion of the at least one uncombusted combustible gas from the slagging combustor gas effluent with at least a portion of the third oxidant mixture in the combustion space of the melting furnace. The third oxidant mixture may be introduced between the slagging combustor gas effluent and a melt/raw material space.

The first oxidant mixture may have an oxygen concentration of 10 volume % to 20 volume % and the first oxidant mixture may contain a flue gas from the melting furnace.

The second fuel may contain at least a portion of the slagging combustor gas effluent.

The method may further comprise introducing the molten slag into the melting furnace.

The melting furnace may be a glassmelting furnace having a melting zone and a fining zone. The method may further comprise introducing the molten slag into the melting zone and not introducing the molten slag into the fining zone.

The method may further comprise introducing a slagging additive into the slagging chamber. The slagging additive may comprise at least one of glass cullet, a raw glassmaking material, and ash from another process.

DETAILED DESCRIPTION

Figure 1:
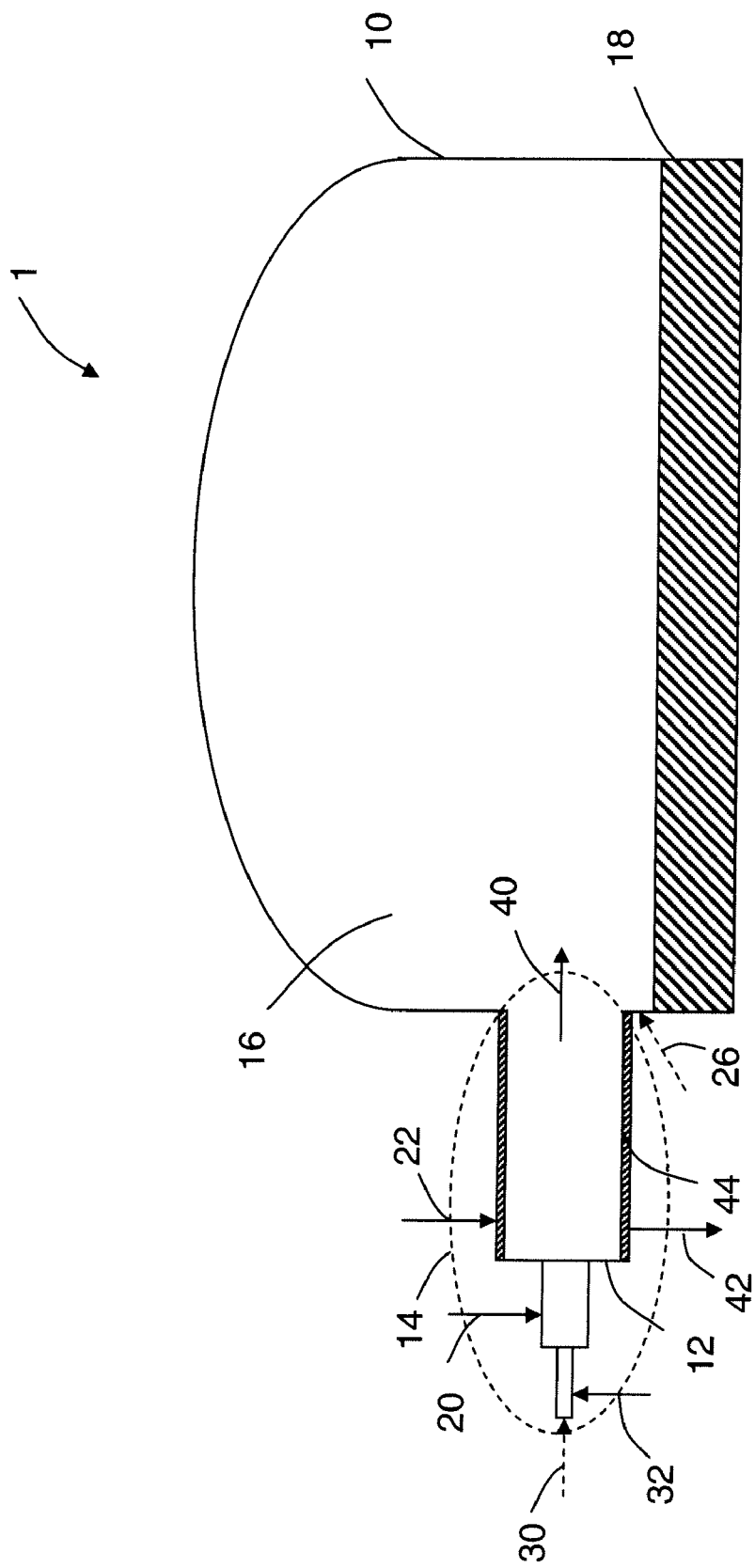
FIG. 1 is a schematic view of a melting furnace with a slagging combustor.

The present invention relates to a method for supplying heat to a melting furnace for forming a molten product. The method may comprise one or more of the following features, taken alone, or in any possible technical combinations. A schematic of an exemplary apparatus 1 for carrying out the method is shown in FIG. 1. The apparatus comprises a melting furnace 10 and a slagging combustor 14.

For the purposes of simplicity and clarity, detailed descriptions of well-known devices, and methods are omitted so as not to obscure the description of the present invention with unnecessary detail.

A melting furnace is any enclosed structure in which heat is generated for producing liquefied material from solid material. When in operation, a melting furnace generally has a combustion space 16 located above a melt/raw material space 18 containing melted and unmelted materials. The combustion space is a predominantly gaseous region above the space containing melted and unmelted materials and bounded by walls and roof of the furnace. Visible combustion flames are generally present in the combustion space, except for instances where hot non-combustible gases are introduced into the furnace to melt the materials or where flameless combustion techniques are used. Glassmelting furnaces, copper melting furnaces, and aluminum melting furnaces are examples of melting furnaces. Melting furnaces are well known. Materials of construction and methods of construction are known.

A molten product is any product fused or liquefied by heat. Molten glass, molten copper, and molten aluminum are examples of molten products. A method for forming a molten product includes introducing molten product making materials into the melting furnace in addition to supplying heat.

The method for supplying heat comprises introducing a first fuel 20 into a slagging chamber 12 of a slagging combustor 14. The first fuel has an ash component and a combustible component. The first fuel may be introduced directly into the slagging chamber or indirectly by way of a secondary burner conduit. The first fuel may be introduced along with a carrier gas, typically air. The first fuel is introduced at a first fuel flow rate, $F_1$, having units of kg/s, for example, or other suitable units of measure. The first fuel has a first fuel gross heating value, $H_1$, having units of J/kg, for example, or other suitable units of measure.

A fuel is a carbon-containing material used to produce heat or power by burning or combustion. Coal, petroleum coke (petcoke), biofuel, fuel oil, diesel, gasoline, kerosene, propane, methane and natural gas are examples of fuels.

The first fuel may be any fuel having an ash component and a combustible component. For example, the first fuel may be coal, petroleum coke, biofuel or mixtures thereof.

An ash component is defined as any non-combustible mineral matter left as a residue when the combustible material is thoroughly burned or oxidized by chemical means. Ash comprises inorganic incombustible matter present in the parent fuel, often comprising oxides of silicon, aluminum, iron, calcium, magnesium, sodium, potassium and vanadium.

A combustible component is any substance capable of chemically reacting exothermically with oxygen.

A slagging combustor is a device for combusting at least a portion of a fuel having an ash component with an oxidant, the device having at least one conduit for introducing the fuel and/or oxidant, at least one slagging chamber, and at least one exhaust port for discharging slagging combustor gas effluent. Molten slag may be discharged from the at least one exhaust port or through one or more other molten slag discharge ports or taps.

A slagging chamber is defined as any chamber or conduit constructed of a material compatible with molten slag for receiving at least one fuel having an ash component and for receiving at least one oxidant mixture, and collecting at least a portion of the ash component as a layer of molten slag. A fuel having an ash component and an oxidant may be introduced into a slagging chamber and at least partially combusted. Ash contained in the fuel may be heated to a temperature above the ash melting point thereby converting the ash from a solid to a liquid or molten phase. The molten ash (slag) may be physically separated from the gaseous products of combustion of the fuel and collected as a molten layer of slag. Separation of the molten ash from the gaseous products within the slagging chamber may occur due to centrifugal, inertial, gravitational, electrostatic, magnetic, other suitable force or combinations thereof.

A slagging chamber relying on centrifugal forces may be a cylindrical "barrel" into which the fuel having an ash component is introduced with appreciable tangential momentum causing an acceleration of ash particles to the walls of the chamber where the slag layer is formed. Molten slag may flow via gravity to a slag-tap for discharge and disposal.

A sagging chamber relying on inertial and/or gravitational forces may comprise a "U"-shaped conduit. A fuel having an ash component and a oxidant mixture may be introduced downwardly into the "U"-shaped conduit, combust to form combustion products and a separated ash component. The separated ash component may form a slag layer at the bottom of the "U"-shaped conduit. The molten slag may be tapped from the bottom of the "U"-shaped conduit. Various geometries may be readily envisioned to carry out separation of the separated ash component from combustion products by inertial and/or gravitational forces.

Fuel(s) and oxidant(s) may be introduced horizontally in a gravity-based slagging chamber having a horizontal section and a vertical section. The gases may flow upward in the vertical section while the separated ash component impinges on the wall of the vertical section and subsequently runs down and is tapped from the bottom of the vertical section.

One skilled in the art can readily select a suitable slagging combustor with slagging chamber. The particular form of the slagging chamber is not critical to the method.

Slagging combustors for boilers are known. For example, see U.S. Pat. Nos. 6,910,432 and 6,968,791 to D'Agostini et al., U.S. Pat. No. 6,085,674 to Ashworth, U.S. Pat. No. 5,878,700 to Farzan et al. and U.S. Pat. No. 5,209,187 to Khinkis.

The method comprises introducing a first oxidant mixture 22 into the slagging chamber of the slagging combustor. The first oxidant mixture is generally a gas and may have an oxygen concentration, $Y_1$, of 10 volume % to 100 volume %. The balance of the first oxidant mixture may contain such species as nitrogen and argon, and may further contain species such as carbon dioxide, sulfur dioxide, and water vapor for example if flue gas recirculation is used.

The first oxidant mixture may have an oxygen concentration of 20 volume % to 30 volume %. The first oxidant mixture may be air.

Through the use of flue gas recirculation, the first oxidant mixture may contain a flue gas from the melting furnace and have an oxygen concentration of 10 volume % to 20 volume %. The first oxidant mixture may be introduced directly into the slagging chamber as shown in FIG. 1 or indirectly by way of a secondary burner conduit. The first oxidant mixture is introduced at a first oxidant mixture volumetric flow rate, $V_1$.

The first oxidant mixture may be introduced in a tangential manner to create a centrifugal force that moves the separated ash component from the first fuel toward the inner wall of the slagging chamber.

Optionally, the method comprises introducing a second fuel 30 into the slagging chamber of the slagging combustor. The second fuel may be a fuel not having a significant ash component, i.e. less than 0.1 weight %. The second fuel may be fuel oil, diesel, gasoline, kerosene, propane, methane, natural gas or mixtures thereof. The second fuel may contain a portion of slagging combustor gas effluent. The second fuel may be provided to augment the combustion and temperature within the slagging chamber thereby affecting the viscosity of the layer of molten slag which has been collected in the slagging chamber. If the second fuel is used, the second fuel is introduced at a second fuel flow rate, $F_2$, having units of kg/s, for example, or other suitable units of measure. The second fuel has a second fuel gross heating value, $H_2$, having units of J/kg, for example, or other suitable units of measure. If the second fuel is used, the second fuel may provide up to and including 25% of the total energy introduced to the slagging combustor, such that $$\frac{F_2 \times H_2}{F_1 \times H_1 + F_2 \times H_2} \leq 0.25.$$

The method comprises introducing a second oxidant mixture 32 into the slagging chamber of the slagging combustor. The second oxidant mixture is generally a gas and may have an oxygen concentration, $Y_2$, of 22 volume % to 100 volume %. The balance of the second oxidant mixture may comprise nitrogen, carbon dioxide, water vapor, argon and trace amounts of other species.

The second oxidant mixture may have an oxygen concentration of 60 volume % to 75 volume %. Air separation plants for the production of nitrogen may have an oxygen vent stream having an oxygen concentration of 60 volume % to 75 volume %.

The second oxidant mixture may have an oxygen concentration of 85 volume % to 100 volume %. The second oxidant mixture may be industrial grade oxygen produced from an air separation plant.

As described further in U.S. Pat. No. 6,968,791, the second oxidant mixture may be used to augment combustion and temperature in the slagging chamber thereby affecting the viscosity of the layer of molten slag which has been collected in the slagging chamber. The second oxidant mixture is introduced at a second oxidant mixture volumetric flow rate, $V_2$.

The method comprises combusting at least a portion of the combustible component of the first fuel and, if present, at least a portion of the second fuel in the slagging chamber of the slagging combustor thereby forming a separated ash component and forming a slagging combustor gas effluent 40.

A separated ash component is any non-gas component comprising the ash component from the first fuel that has been separated from the combustible component during the combustion event.

Slagging combustor gas effluent is any gaseous effluent from the slagging combustor. Slagging combustor gas effluent may contain products of combustion and/or at least one uncombusted combustible gas.

Essentially all, for instance at least 95%, of the first fuel and all of the second fuel may be combusted within the slagging combustor. Alternatively, a portion of the first fuel may be combusted within the slagging combustor leaving at least one uncombusted combustible gas, also called incomplete products of combustion, available for combustion within the melting furnace 10. In case only a portion of the first fuel is combusted within the slagging combustor, the slagging combustor gas effluent will typically contain carbon monoxide as one of the uncombusted combustible gases.

The method comprises collecting at least a portion of the separated ash component as a layer of a molten slag 44. The layer of molten slag may be formed contiguous with at least a portion of an inner surface of the slagging chamber. The layer of molten slag helps to protect the wall of the slagging chamber from any high temperature flame that may be present within the slagging chamber. The slagging combustor may be designed and operated so that essentially all, i.e. greater than 90%, of the separated ash component is collected as a layer of molten slag in the slagging chamber. The percentage of ash component collected may be calculated from a mass balance knowing the average content of ash in the first fuel and the amount of slag withdrawn from the slagging chamber. Since most of the ash is collected in the slagging chamber, the ash has less opportunity to cause defects in the molten product.

Separated ash component released into the melting furnace may also promote deterioration of the melting furnace refractory. Reducing the amount of separated ash component entering the combustion space of the furnace may reduce corrosion of the melting furnace refractory.

Separated ash component released into the melting furnace may also increase the mass flow rate of solid particulate exhausted from the melting furnace. Reducing the amount of separated ash component entering the combustion space may therefore reduce the size of a particulate control device required to clean up the exhaust gas stream from the melting furnace.

The use of the second oxidant mixture and optionally the second fuel, may provide several benefits. Enhanced slag temperature control is one of the benefits of the method, since it allows augmentation of particulate capture and improves process turndown. The correlation between slag temperature and particulate collection is made via the slag viscosity. Suitable slag viscosity is needed for efficient capture of particulates by the molten slag attached to the walls of the slagging chamber. Low slag temperatures produce viscosity that is too high, leading to localized solidification and, subsequently, particle rebounding off the slag surface back into the gaseous phase. Conversely, high slag temperatures produce a low viscosity condition leading to runny slag that also has relatively poor adhesive properties. The selective use of oxygen enrichment and/or secondary fuel provides an effective means of controlling slag temperature independent of other process operating parameters.

The method comprises passing the slagging combustor gas effluent from the slagging chamber of the slagging combustor into a combustion space 16 in the melting furnace 10 at a temperature of 1000° C. to 2500° C. to supply heat to form the molten product. Hot combustion gases may used to supply heat for melting the raw materials to form the molten product.

The temperature may be measured using a suction pyrometer, for example, a water-cooled suction pyrometer probe available from METLAB, Enkoping, Sweden. Water-cooled suction pyrometer probes may also be available from the International Flame Research Foundation (IFRF), Netherlands. Temperature measurement of furnace gases is known in the art. Any suitable device known in the art may be used to determine the temperature of the slagging combustor gas effluent.

The slagging combustor gas effluent is generally a non-luminous gaseous medium for supplying heat to the melting furnace. Luminosity may be described in terms of a luminosity ratio. The luminosity ratio is defined herein as the ratio of thermal radiation emanating from the heating source in the 600-1500 nm bandwidth to the thermal radiation emanating from the heating source in the 600-4800 nm bandwidth (see, for example, U.S. Pat. No. 5,575,637). Non-luminous heating sources have a luminosity ratio value of less than or equal to 0.14, while luminous heating sources have a luminosity ratio value of greater than 0.14. The luminosity ratio may be calculated from spectral emission signature of the gaseous heating medium. The spectral emission data may be measured using a spectral radiometer such as the Macam Spectroradiometer system.

Luminosity in a hot gas is produced by black body radiation emanating from particles contained within the gas. These particles comprise two components: soot particles formed via nucleation of gaseous hydrocarbons during the fuel combustion process, and residual particles contained within the fuel source. The concentration of gaseous hydrocarbons produced by the present method, however, is small, owing to the relatively large amount of combustion taking place within the slagging chamber to maintain temperatures in excess of the ash melting temperature. Moreover, the amount of residual fuel particles is small because of the ash removal process provided by the method. Therefore, the primary modes of heating within the melting chamber are convection from the slagging combustor gas effluent to the melt/raw material, and radiation from the walls and roof of the melting furnace to the melt/raw material.

Non-luminous heating is contrary to teachings in the art using coal or other pulverized solid fuels.

For example, U.S. Pat. No. 4,006,003 to Daiga states that it was also observed that the flames produced from a slurry of coal and oil respectively having 27% by weight coal (73% oil) and 40% by weight coal (60% by weight oil) were more luminous than oil alone. Daiga also states that the burner was disposed approximately 2 ft. above the level of the molten glass and was adjusted so that the flame was inclined downwardly towards the surface of the molten pool of glass with the end of the flame licking the upper surface of those batch ingredients which were floating upon the molten pool of glass.

U.S. Pat. No. 3,969,068 to Miller et al. is a method and apparatus for direct coal firing of glass tank furnaces wherein pulverized coal entrained in an air stream is impelled through a nozzle into the furnace and combusted in the atmosphere directly above the melt in a glass furnace, to form a luminous flame, the direct coal firing preferably being used in conjunction with supplementary conventional heat sources. It is an object of '068 to provide a new and improved method and apparatus for direct firing of glass tank furnaces with coal in order to provide a luminous flame for more effective heating of the glass melt.

U.S. Pat. No. 6,789,396 to Olin-Nunez et al. states that during the operation of the furnace, the regenerators are cycled alternately between combustion air and exhaust cycles. Every 20 minutes, or 30 minutes, depending on the specific furnaces, the path of the flame of a series of burners are reversed. So, the resultant flame and products of combustion produced in each burner pass across the surface of the melting glass, and transfer heat to that glass in the melting chamber and refining chamber.

U.S. Pat. Appl. 2006/0150677 by Kobayashi states that the oxy-fuel burners are arranged so that the flames they support are in the interior of the furnace above the surface of the molten glass.

The luminosity of the slagging combustor gas effluent may be optionally augmented by injecting a third fuel into the combustion space of the melting furnace, mixing at least a portion of the third fuel with at least a portion of the slagging combustor gas effluent, and combusting at least a portion of the third fuel in the combustion space of the melting furnace to form a luminous flame. The third fuel may be a fuel not having a significant ash component, i.e. less than 0.1 weight %. The third fuel may be fuel oil, diesel, gasoline, kerosene, propane, methane, natural gas or mixtures thereof. The third fuel may be the same composition as the second fuel.

The method comprises withdrawing the molten slag 42 from the slagging chamber 12 of the slagging combustor 14. In cases where the molten slag is not compatible with the molten product, the molten slag may be disposed of. In cases where the molten slag is compatible with the molten product, the molten slag may be controllably introduced into the melt/raw material space 18.

For the case of a glassmelting furnace, the molten slag may be selectively introduced into the melting end or melting zone of the glassmelting furnace and not introduced into the fining zone. Introducing the molten slag into the melting zone of the glassmelting furnace, gives the glassmelting furnace greater opportunity to homogenize the molten slag in the glass product prior to the glass forming operation.

A glass melting furnace may be divided into two zones: a melting zone and a fining zone. The melting zone is that length of the glassmelting furnace having visible batch (unmelted raw materials) on the surface of the melt. The visible batch on the surface of the melt may be in the form of a batch blanket, batch piles, batch islands, batch logs, etc. The length of the melting zone extends from the backwall to the furthest downstream visible batch and may contain regions of melt without visible batch on the glass surface. The fining zone is the remaining length of the glassmelting furnace. As described herein, the frontwall corresponds to the downstream furnace wall and the backwall corresponds to the upstream furnace wall. The length dimension is the dimension corresponding to the bulk flow of the glass melt from the backwall to the frontwall. The charging end portion corresponds to the furnace end portion where glass making raw materials are introduced. Glass making raw materials may be introduced into the furnace at the backwall or from one or both side walls near the backwall.

In a glass furnace, the method may be used in various hybrid configurations. The method may have more than 50% oxy-fuel combustion in the melting zone and more than 50% air-fuel combustion in the fining zone. The method may utilize slagging combustors in the melting zone and conventional oxy-fuel burners and/or air-fuel burners in the fining zone.

Oxy-fuel combustion is defined herein as combustion wherein the average oxygen concentration of the oxidant mixture for the combustion event is 30 volume % to 100 volume %. Air-fuel combustion is defined herein as combustion wherein the average oxygen concentration of the oxidant mixture for the combustion event is 15 volume % to 22 volume %. Oxygen-enriched air-fuel combustion is defined herein as combustion wherein the average oxygen concentration of the oxidant mixture for the combustion event is between 22 volume % and 30 volume %. In case multiple oxidant streams are introduced to combust a fuel, determination of the type of combustion is based on volumetric flow weighted average of the multiple oxidant streams.

As described above, only a portion of the first fuel may be combusted within the slagging combustor leaving uncombusted combustible gases available for combustion within the melting furnace 10. The method may comprise reacting only a portion of the first fuel leaving a significant quantity of the at least one uncombusted combustible gas. The method may further comprise introducing a third oxidant mixture into the combustion space 16 of the melting furnace 10. The third oxidant mixture may be introduced at a third oxidant mixture volumetric flow rate, $V_3$.

The third oxidant mixture may have an oxygen concentration, $Y_3$, of 20 volume % to 100 volume %. The balance of the third oxidant mixture may comprise nitrogen, carbon dioxide, water vapor, argon and trace amounts of other species.

The third oxidant mixture may have an oxygen concentration of 60 volume % to 75 volume % or 85 volume % to 100 volume %. The third oxidant mixture may be from a vent stream from a nitrogen plant. The third oxidant mixture may be industrial grade oxygen produced from an air separation plant. The third oxidant mixture may come from the same source and may be the same composition as the second oxidant mixture.

The method may comprise combusting at least a portion of the at least one uncombusted combustible gas from the slagging combustor gas effluent with at least a portion of the third oxidant mixture in the combustion space of the melting furnace.

The third oxidant mixture may be introduced between the slagging combustor gas effluent and the melt/raw material space. The slagging combustor has at least one exhaust port for discharging the slagging combustor gas effluent. The nozzle for introducing the third oxidant mixture may be located between the at least one exhaust port for discharging the slagging combustor effluent and the melt/raw material space.

The method may further comprise introducing a slagging additive into the slagging chamber. The slagging additive may comprise glass cullet, one or more raw glassmaking materials, and/or ash from another process.

In the event that the first fuel has a very low ash content, such as is the case with petroleum coke or anthracite coal, it may be difficult to form a suitable layer of molten slag. The layer of molten slag serves as a barrier to protect the underlying substrate of the slagging chamber from high temperature damage. Another role of the additive is to remove pollutants from the fuel/ash mixture. Conventional calcium or magnesium based sorbents are examples of sorbents that can be used for this purpose. The slagging additive may be introduced into the slagging chamber in any suitable manner. The slagging additive may be introduced with the first fuel, the second fuel, the first oxidant mixture, the second oxidant mixture or as a separate stream.

Those skilled in the art will recognize that NOx emissions can be reduced by the selective use of oxygen. For example, oxygen injection near the first fuel nozzle where it is introduced into the slagging chamber will enhance volatilization of the first fuel prior to complete mixing of the first fuel and the first oxidant mixture. Alternatively, an oxidant mixture may be introduced in a downstream section of the slagging chamber, thereby staging combustion internal to the slagging chamber. As described above for the third oxidant mixture, an oxidant mixture may be introduced in the furnace, thereby staging combustion in the furnace and external to the slagging chamber.

When the optional second fuel is used, it was observed that NOx emissions were affected by the equivalence ratio of the second fuel and the second oxidant mixture. The second fuel and the second oxidant mixture may be introduced having an equalence ratio of 1.4 to 3. In general terms, the equivalence ratio is defined as the fuel:oxidizer ratio divided by the fuel:oxidizer ratio corresponding to complete combustion. The latter ratio (fuel:oxidizer ratio corresponding to complete combustion) is often referred to as the stoichiometric fuel:oxidizer ratio. An equivalence ratio of 1 means that fuel and oxidant are provided in the theoretically correct or stoichiometric amount. An equivalence ratio greater than 1 is fuel rich and an equivalence ratio less than 1 is fuel lean.

Figure 2:
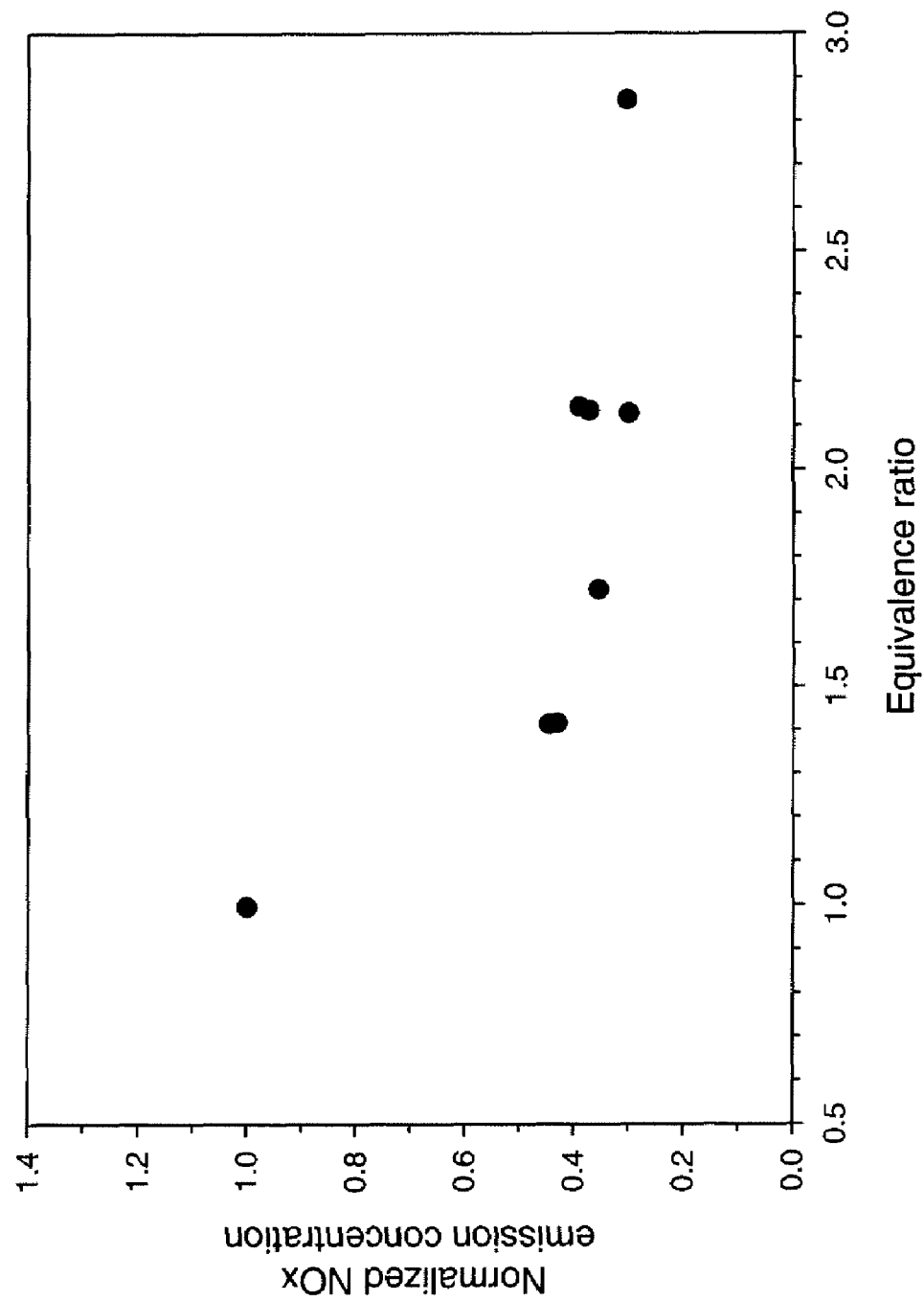
FIG. 2 is a plot of NOx emissions versus equivalence ratio of the second fuel and the second oxidant mixture.

FIG. 2 shows a plot of normalized NOx emissions as a function of the equivalence ratio of the second fuel and the second oxidant mixture. For these experiments, the first oxidant mixture is air, the first fuel is bituminous coal, the second fuel is No. 2 fuel oil, and the second oxidant mixture is nearly 100% oxygen (from a LOX source). The fuel energy input from the second fuel was 18% of the total energy. The overall equivalence ratio of the combustion process, including all fuels and oxidant mixtures was about 0.79. As can be seen from FIG. 2, NOx is reduced by more than half of the value for near stoichiometric operation of the second fuel and the second oxidant mixture (i.e. equivalence ratio equal to about 1). As the equivalence ratio is increased, the effectiveness of the second fuel and the second oxidant mixture to assist with the maintaining a liquid slag layer is diminished, suggesting an upper equivalence ratio limit of about 3.

Another potential benefit of using oxygen is the broadening of the range of fuels amenable for supplying heat to a melting furnace. This again stems from the ability to independently control slag temperature through modulations of either second oxidant mixture/second fuel combustion or selective oxygen enrichment as previously described. For example, the burning of coals with high ash fusion temperatures has traditionally be problematic in air-fuel fired slagging combustors due to the inability to generate temperatures high enough to maintain stable slag flow. Test results carried out on a 2.5 MMBtu/h (0.73 MW thermal) slagging combustor burning a low-sulfur, high ash fusion temperature coal demonstrated stable slagging and overall performance operation with the present method operating with 20% co-firing of No. 2 fuel oil. Conversely, a stable molten slag could not be maintained using air-fuel combustion alone. Similar benefits may be attained with other solid fuels that are challenging to slag, including many high moisture coals and biofuels.

While specific embodiments of the method have been described in detail, persons skilled in the art will appreciate that various modifications and alterations may be developed in light of the overall teachings of the disclosure. Accordingly, although illustrated and described herein with reference to certain specific embodiments and variations thereof, the present invention is nevertheless not intended to be limited to the details shown and described. Rather, various modifications may be made in the details within the scope and range of equivalents of the claims and without departing from the spirit of the invention.

I claim:

1. A method for supplying heat to a melting furnace for forming a molten product, the method comprising:

introducing a first fuel having an ash component and a combustible component into a slagging chamber of a slagging combustor;

introducing a first oxidant mixture into the slagging chamber of the slagging combustor, the first oxidant mixture having an oxygen concentration of 10 volume % to 100 volume %;

introducing a second fuel into the slagging chamber of the slagging combustor;

introducing a second oxidant mixture into the slagging chamber of the slagging combustor, the second oxidant mixture having an oxygen concentration of 22 volume % to 100 volume % wherein the second fuel and the second oxidant mixture are introduced having an equivalence ratio of 1.4 to 3;

combusting at least a portion of the combustible component of the first fuel and at least a portion of the second fuel in the slagging chamber of the slagging combustor thereby forming a separated ash component and forming a slagging combustor gas effluent;

collecting at least a portion of the separated ash component as a layer of a molten slag contiguous with at least a portion of an inner surface of the slagging chamber;

passing at least a portion of the slagging combustor gas effluent from the slagging chamber of the slagging combustor into a combustion space in the melting furnace at a temperature of 1000° C. to 2500° C. to supply heat to form the molten product; and withdrawing the molten slag from the slagging chamber of the slagging combustor.

2. The method of claim 1 wherein the oxygen concentration of the first oxidant mixture is 20 volume % to 30 volume %.

3. The method of claim 1 wherein the oxygen concentration of the first oxidant mixture is 10 volume % to 20 volume %.

4. The method of claim 1 wherein the oxygen concentration of the second oxidant mixture is 60 volume % to 75 volume %.

5. The method of claim 1 wherein the oxygen concentration of the second oxidant mixture is 85 volume % to 100 volume %.

6. The method of claim 1 wherein the slagging combustor gas effluent contains at least one uncombusted combustible gas.

7. The method of claim 6 further comprising:
introducing a third oxidant mixture into the combustion space of the melting furnace, the third oxidant mixture having an oxygen concentration of 20 volume % to 100 volume %; and
combusting at least a portion of the at least one uncombusted combustible gas from the slagging combustor gas effluent with at least a portion of the third oxidant mixture in the combustion space of the melting furnace.

8. The method of claim 7 wherein the oxygen concentration of the third oxidant mixture is 60 volume % to 75 volume %.

9. The method of claim 7 wherein the oxygen concentration of the third oxidant mixture is 85 volume % to 100 volume %.

10. The method of claim 7 wherein the third oxidant mixture is introduced between the slagging combustor gas effluent and a melt/raw material space.

11. The method of claim 1 further comprising:
introducing the molten slag into a melt/raw material space of the melting furnace.

12. The method of claim 1 wherein the melting furnace is a glassmelting furnace having a melting zone and a fining zone, the method further comprising:
introducing the molten slag into the melting zone and not introducing the molten slag into the fining zone.

13. The method of claim 1 further comprising:
introducing a slagging additive into the slagging chamber.

14. The method of claim 13 wherein the slagging additive comprises at least one of glass cullet, a raw glassmaking material, and ash from another process.

15. The method of claim 1 wherein the first oxidant mixture contains a flue gas from the melting furnace and the first oxidant mixture has an oxygen concentration of 10 volume % to 20 volume %.

16. The method of claim 1 wherein the second fuel contains at least a portion of the slagging combustor gas effluent.

* * * * *